US010503056B2

(12) United States Patent
Kudo (10) Patent No.: US 10,503,056 B2
(45) Date of Patent: Dec. 10, 2019

(54) PROJECTOR AND METHOD OF CONTROLLING PROJECTOR THAT DETERMINES WHETHER A LENS HAS BEEN REPLACED (71) Applicant: SEIKO EPSON CORPORATION, Tokyo (JP)

(72) Inventor: Yusuke Kudo, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/987,202

(22) Filed: May 23, 2018

(65) Prior Publication Data
US 2018/0343424 A1 Nov. 29, 2018

(30) Foreign Application Priority Data
May 29, 2017 (JP) .................. 2017-105186

(51) Int. Cl.
G03G 21/14 (2006.01)
G03B 21/14 (2006.01)
H04N 9/31 (2006.01)

(52) U.S. Cl.
CPC ........... *G03B 21/142* (2013.01); *H04N 9/317* (2013.01); *H04N 9/3194* (2013.01)

(58) Field of Classification Search
CPC ............... G02B 7/102; G03B 17/14; G03B 2205/0046; G03B 2206/00; G03B 3/10; G03B 21/142; G03B 2205/0053; G03B 5/04; H04N 5/23212; H04N 9/317; H04N 9/3194
See application file for complete search history.

(56) References Cited

U.S. PATENT DOCUMENTS

| 4,748,509 A * | 5/1988 | Otake ............... H04N 5/23212 348/333.02 |
| 5,144,491 A * | 9/1992 | Ushiro .................. G02B 7/102 348/347 |
| 5,802,405 A * | 9/1998 | Sugimoto ............. G02B 7/102 396/129 |
| 6,592,228 B1 * | 7/2003 | Kawashima .......... G03B 21/11 348/745 |
| 6,683,652 B1 * | 1/2004 | Ohkawara .......... H04N 5/23209 348/347 |

(Continued)

FOREIGN PATENT DOCUMENTS

JP 2011-145583 A 7/2011
JP 2014-174314 A 9/2014

OTHER PUBLICATIONS https://www.dpreview.com/reviews/panasonic-x-14-42-3p5-5p6.*

*Primary Examiner* — Bao-Luan Q Le
(74) *Attorney, Agent, or Firm* — Oliff PLC (57) ABSTRACT

A projector includes a drive section adapted to move a projection lens, a projection section adapted to project image light through the projection lens, and a determination section adapted to determine whether or not the projection lens has been replaced based on a first position as a position of the projection lens at a first time point at which power supply to the projector is stopped, and a second position as a position of the projection lens at a second time point at which the power supply is started after the first time point.

8 Claims, 5 Drawing Sheets (56) References Cited

U.S. PATENT DOCUMENTS

| | | | | |
|---|---|---|---|---|
| 6,721,012 B2* | 4/2004 | Kawamura | H04N 5/23209 | |
| | | | 348/240.99 | |
| 6,954,313 B2* | 10/2005 | Kaneda | G02B 7/102 | |
| | | | 359/694 | |
| 7,013,082 B2* | 3/2006 | Kaneda | G02B 7/102 | |
| | | | 359/696 | |
| 8,287,140 B2* | 10/2012 | Fujimaki | G03B 21/142 | |
| | | | 353/100 | |
| 8,355,071 B2* | 1/2013 | Yamanaka | G02B 7/102 | |
| | | | 348/335 | |
| 8,702,243 B2* | 4/2014 | Ishii | H04N 9/3185 | |
| | | | 353/100 | |
| 8,905,557 B2* | 12/2014 | Kano | G03B 21/142 | |
| | | | 353/101 | |
| 9,128,360 B2* | 9/2015 | Kano | G03B 21/142 | |
| 9,591,214 B2* | 3/2017 | Qiu | H04N 5/23241 | |
| 2003/0128288 A1* | 7/2003 | Kawamura | H04N 5/23209 | |
| | | | 348/335 | |
| 2004/0114251 A1* | 6/2004 | Kaneda | G02B 7/102 | |
| | | | 359/694 | |
| 2005/0232618 A1* | 10/2005 | Kaneda | G02B 7/102 | |
| | | | 396/79 | |
| 2010/0195063 A1* | 8/2010 | Fujimaki | G03B 21/142 | |
| | | | 353/101 | |
| 2011/0115968 A1* | 5/2011 | Yamanaka | G02B 7/102 | |
| | | | 348/357 | |
| 2011/0292351 A1* | 12/2011 | Ishii | H04N 9/3185 | |
| | | | 353/69 | |
| 2012/0218528 A1* | 8/2012 | Kano | G03B 21/142 | |
| | | | 353/101 | |
| 2013/0113985 A1* | 5/2013 | Ikeda | G02B 7/102 | |
| | | | 348/347 | |
| 2015/0070664 A1* | 3/2015 | Kano | G03B 21/142 | |
| | | | 353/101 | |
| 2016/0094786 A1* | 3/2016 | Qiu | H04N 5/23241 | |
| | | | 348/360 | |
| 2017/0124926 A1* | 5/2017 | Mitsuhashi | G09G 3/002 | |
| 2017/0155838 A1* | 6/2017 | Qiu | H04N 5/23241 | |

* cited by examiner

| | DETECTION RESULT | | INDIVIDUAL DETERMINATION (WITHIN ± 15 ?) | DETERMINATION RESULT ON PROJECTION LENS REPLACEMENT |
|---|---|---|---|---|
| | THIS TIME | LAST TIME | | |
| FOCUSING LENS | 86 | 86 | ○ | NO REPLACEMENT OCCURRED |
| ZOOM LENS | 149 | 155 | ○ | |

FIG. 5

| | DETECTION RESULT | | INDIVIDUAL DETERMINATION (WITHIN ± 15 ?) | DETERMINATION RESULT ON PROJECTION LENS REPLACEMENT |
|---|---|---|---|---|
| | THIS TIME | LAST TIME | | |
| FOCUSING LENS | 15 | 86 | × | REPLACEMENT OCCURRED |
| ZOOM LENS | 150 | 155 | ○ | |

FIG. 6

PROJECTOR AND METHOD OF CONTROLLING PROJECTOR THAT DETERMINES WHETHER A LENS HAS BEEN REPLACED

CROSS-REFERENCE

The entire disclosure of Japanese Patent Application No. 2017-105186 filed May 29, 2017 is expressly incorporated by reference herein.

BACKGROUND

1. Technical Field

The present invention relates to a projector and a method of controlling a projector.

2. Related Art

In JP-A-2011-145583 (Document 1), there is described a projector which adjusts the position of a projection lens. In this projector, setting data such as a zoom state, a focus state, and a lens shift state of the projection lens are firstly stored. Subsequently, the projector detects the current position of the projection lens, and then moves the position of the projection lens from the current position to a target position corresponding to the setting data.

Incidentally, such a projector as described in Document 1 detects the position of the projection lens using a sensor provided to the projector. However, due to individual variations of sensors, the correspondence relationship between the output of the sensor and the actual position of the projection lens differs from the correspondence relationship assumed in the design process. Therefore, it is necessary for the projector to perform an operation (a lens calibration) for actually moving the projection lens to check the correspondence relationship between the output of the sensor and the actual position of the projection lens. Further, it is necessary for the lens calibration to be performed with replacement of the projection lens. Therefore, in order to perform the lens calibration with an appropriate timing, there is desired a technology for determining whether or not the projection lens has been replaced.

The projection lens is provided with a lens type ID representing the type of the projection lens. Therefore, it is also conceivable that the projector determines that the projection lens has been replaced in the case in which the lens type ID checked in the present operation is different from the lens type ID checked in the previous operation.

However, in the method of determining the replacement of the projection lens using the lens type ID, it is unachievable to detect the replacement of the projection lens in the case in which the lens type ID of the projection lens after the replacement is the same as the lens type ID of the projection lens before the replacement.

SUMMARY

An advantage of some aspects of the invention is to provide a method capable of detecting the replacement of the projection lens even if the type of the projection lens before the replacement and the type of the projection lens after the replacement are the same.

A projector according to an aspect of the invention is a projector including a drive section adapted to move a projection lens, a projection section adapted to project image light through the projection lens, and a determination section adapted to determine whether or not the projection lens has been replaced based on a first position and a second position, the first position being a position of the projection lens at a first time point at which power supply to the projector is stopped, the second position being a position of the projection lens at a second time point at which the power supply is started after the first time point.

In the case in which the projection lens is replaced in the period in which the power supply to the projector is stopped, there is a high possibility that the position of the projection lens changes around the period in which the power supply is stopped even if the type of the projection lens before the replacement and the type of the projection lens after the replacement are the same.

According to the aspect of the invention, whether or not the projection lens has been replaced is determined based on the position of the projection lens at the first time point at which the power supply to the projector is stopped, and the position of the projection lens at the second time point at which the power supply is started after the first time point. Therefore, it becomes possible to determine whether or not the projection lens has been replaced even if the type of the projection lens before the replacement and the type of the projection lens after the replacement are the same as each other.

In the projector according to the aspect of the invention described above, it is desirable that the determination section determines that the projection lens has been replaced in a case in which the first position and the second position are different from each other.

According to the aspect of the invention with this configuration, it becomes possible to determine the replacement even if the type of the projection lens before the replacement and the type of the projection lens after the replacement are the same as each other.

In the projector according to the aspect of the invention described above, it is desirable that the determination section determines that the projection lens has been replaced in a case in which a difference between the first position and the second position is longer than a threshold value.

There is a possibility that an error is included in at least one of the first position and the second position. If the error occurs, the first position and the second position are different from each other despite the fact that the projection lens has not been replaced.

According to the aspect of the invention with the configuration described above, it is determined that the projection lens has been replaced in the case in which the distance between the first position and the second position is longer than the threshold value. Therefore, it is possible to reduce the possibility that it is determined that the projection lens, which has not been replaced, has been replaced due to the error even if the error is included in at least one of the first position and the second position compared to the configuration in which it is determined that the projection lens has been replaced in the case in which the first position and the second position are different from each other.

In the projector according to the aspect of the invention described above, it is desirable that the projection lens includes a first lens and a second lens, the drive section moves the first lens and the second lens, and the determination section determines whether or not the projection lens has been replaced based on a relationship between a position of the first lens at the first time point and a position of the first lens at the second time point, and a relationship between a position of the second lens at the first time point and a position of the second lens at the second time point.

According to the aspect of the invention with this configuration, whether or not the projection lens has been replaced is determined based on the relationship between the position of the first lens at the first time point and the position of the first lens at the second time point, and the relationship between the position of the second lens at the first time point and the position of the second lens at the second time point.

Therefore, it becomes possible to determine that the projection lens has been replaced if the positional relationship of the second lens between the first time point and the second time point is in the state in which it is determined that the projection lens has been replaced even if the positional relationship of the first lens between the first time point and the second time point is accidentally in the state in which it is determined that the projection lens has not been replaced despite the fact that the projection lens has been replaced.

In the projector according to the aspect of the invention described above, it is desirable that the projection lens is provided with identification information corresponding to a type of the projection lens, and the determination section determines whether or not the projection lens has been replaced based also on a relationship between the identification information of the projection lens at the first time point and the identification information of the projection lens at the second time point.

According to the aspect of the invention with this configuration, it becomes possible to determine that the projection lens has been replaced based on the relationship between the identification information of the projection lens at the first time point and the identification information of the projection lens at the second time point even if the relationship between the position at the first time point and the position at the second time point in the projection lens becomes in the state in which it is determined that the projection lens has not been replaced despite the fact that the projection lens has been replaced.

In the projector according to the aspect of the invention described above, it is desirable to further include a detection section adapted to detect a position of the projection lens, and a projection control section adapted to make the projection section project image light for prompting measurement of a relationship between an actual position of the projection lens and a position of the projection lens detected by the detection section in a case in which the determination section has determined that the projection lens has been replaced.

According to the aspect of the invention with this configuration, it becomes easy for the process of measuring the relationship between the actual position of the projection lens and the position detected by the detection section to be performed in the case in which the projection lens has been replaced compared to the configuration in which the image light for prompting the measurement of the relationship between the actual position of the projection lens and the position detected by the detection section is not projected.

In the projector according to the aspect of the invention described above, it is desirable to further include a detection section adapted to detect a position of the projection lens, and a measurement section adapted to measure a relationship between an actual position of the projection lens and a position of the projection lens detected by the detection section in a case in which the determination section has determined that the projection lens has been replaced.

According to the aspect of the invention with this configuration, it becomes possible to perform the process (a lens calibration) for measuring the relationship between the actual position of the projection lens and the position detected by the detection section in the case in which the projection lens has been replaced.

A method of controlling operations of a projector according to another aspect of the invention is a method of controlling a projector including the steps of generating image light, projecting the image light through a projection lens which can be moved, and determining whether or not the projection lens has been replaced based on a first position and a second position, as the first position being a position of the projection lens at a first time point at which power supply to the projector is stopped, the second position being a position of the projection lens at a second time point at which the power supply is started after the first time point.

According to the aspect of the invention, it becomes possible to determine whether or not the projection lens has been replaced even if the type of the projection lens before the replacement and the type of the projection lens after the replacement are the same as each other.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Hereinafter, an embodiment of the invention will be described with reference to the accompanying drawings. It should be noted that in the drawings, the size and the scale of each of the constituents are arbitrarily different from actual ones. Further, the embodiment described hereinafter is a preferred specific example of the invention. Therefore, the present embodiment is provided with a variety of technically preferable limitations. However, the scope or the spirit of the invention is not limited to the embodiment unless there is any particular description of limiting the invention in the following description.

First Embodiment

Figure 1:
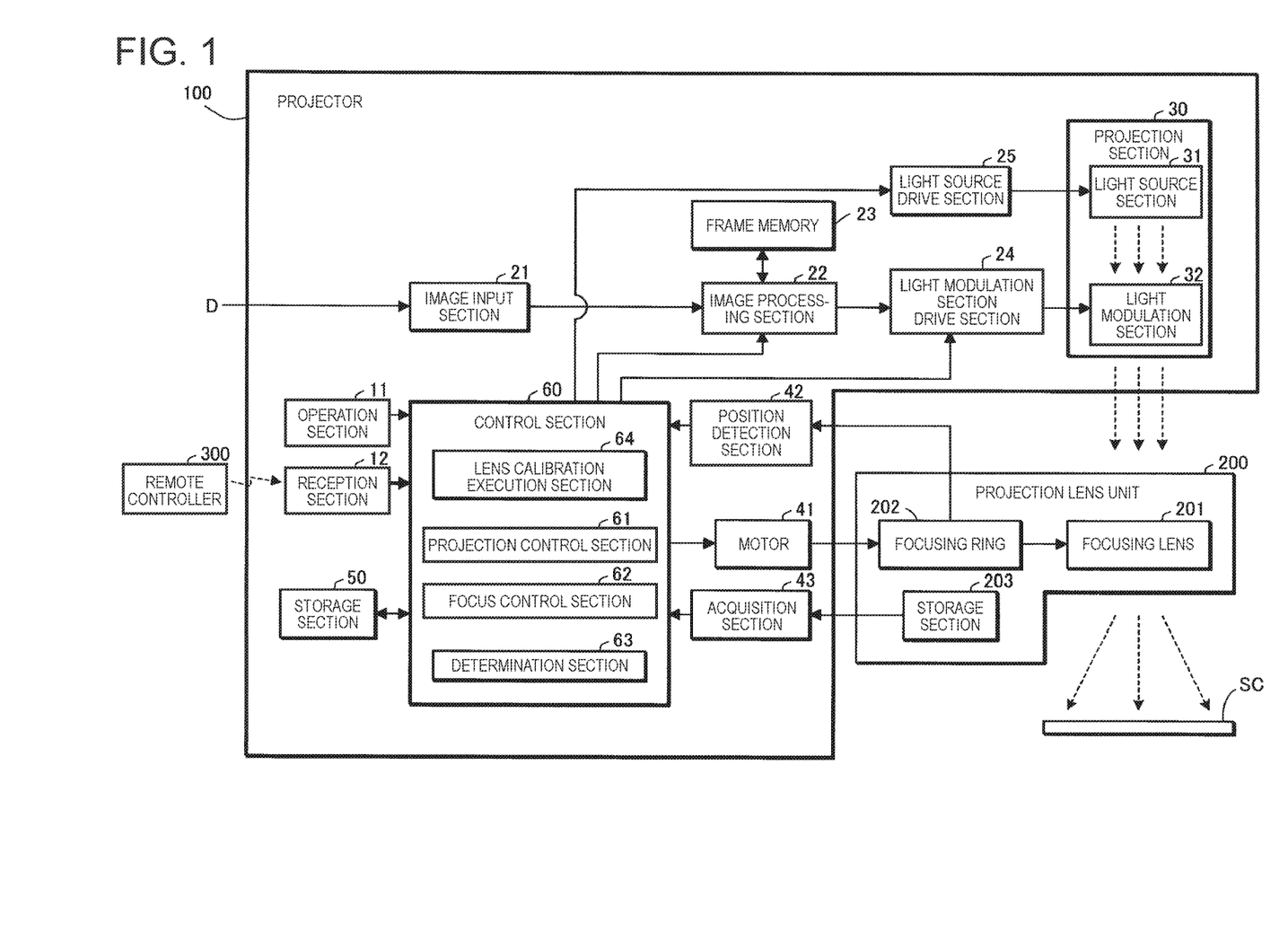
FIG. 1 is a diagram showing a projector according to a first embodiment of the invention.

FIG. 1 is a diagram showing a projector 100 according to the first embodiment.

Firstly, an outline of the projector 100 will be described.

The projector 100 projects image light (an image) on a screen SC through a focusing lens 201 provided to a projection lens unit 200. The screen SC is an example of a projection surface.

The projection lens unit 200 is detachably attached to the projector 100, and can also be replaced. The projection lens unit 200 includes a focusing lens 201, a focusing ring 202, and a storage section 203.

The storage section 203 stores a lens type ID corresponding to the type of the projection lens unit 200. The lens type ID is an example of identification information corresponding to the type of the projection lens unit 200 (the focusing lens 201).

The focusing lens 201 is an example of a projection lens.

The focusing ring 202 can rotate around the optical axis of the focusing lens 201 used as a rotational axis. The focusing lens 201 moves along the optical axis of the focusing lens 201 in accordance with the rotation of the focusing ring 202. Therefore, the position of the focusing lens 201 corresponds to the position (rotational position) of the focusing ring 202.

The projector 100 rotates the focusing ring 202 to thereby move the focusing lens 201. Every time the projector 100 moves the focusing lens 201, the projector detects the position of the focusing lens 201 thus moved.

The projector 100 detects the position (rotational position) of the focusing ring 202 as the position of the focusing lens 201. Every time the projector 100 detects the position of the focusing lens 201, focusing lens position information representing the detection result of the position of the focusing lens 201 is stored in the projector 100.

In the case in which the projector 100 has detected the latest position of the focusing lens 201 in the situation in which the focusing lens position information has already been stored, the projector 100 updates the focusing lens position information having already stored with the focusing lens position information representing the latest position of the focusing lens 201.

Therefore, for example, the focusing lens position information stored in the projector 100 at the time (hereinafter also referred to as a "first time point") when the power supply to the projector 100 is stopped represents the position (hereinafter also referred to as a "first position") of the focusing lens 201 at the first time point as a result.

Further, when the power supply to the projector 100 is started after the first time point, the projector 100 detects the position of the focusing lens 201. The position of the focusing lens 201 detected on this occasion indicates the position (hereinafter referred to as a "second position") of the focusing lens 201 at the time (hereinafter also referred to as a "second time point") when the power supply to the projector 100 is started after the first time point as a result.

Here, in the case in which the projection lens unit 200 installed in the projector 100 has been replaced, there is a high possibility that the first position is different from the second position. The projector 100 determines presence or absence of the replacement of the projection lens unit 200 using this point (the point that there is a high possibility that the first position is different from the second position in the case in which the projection lens unit 200 has been replaced).

When the projector 100 has detected the second position, the projector 100 determines whether or not the projection lens unit 200 (the focusing lens 201) has been replaced based on the first position and the second position. For example, in the case in which the first position and the second position are different from each other, the projector 100 determines that the projection lens unit 200 has been replaced.

Then, a configuration of the projector 100 will be described.

The projector 100 includes an operation section 11, a reception section 12, an image input section 21, an image processing section 22, a frame memory 23, a light modulation section drive section 24, a light source drive section 25, a projection section 30, a motor 41, a position detection section 42, an acquisition section 43, a storage section 50, and a control section 60.

The operation section 11 includes a variety of operation keys for operating the projector 100. For example, the operation section 11 includes a power key for instructing power-ON or power-OFF of the projector 100, and a menu key for performing a variety of settings. When the operation key is operated, the operation section 11 outputs an operation signal corresponding to the operation key thus operated to the control section 60.

The reception section 12 receives an infrared signal transmitted by a remote controller 300. The remote controller 300 is provided with a variety of buttons, and transmits an infrared signal in response to the operation of these buttons. The reception section 12 outputs the operation signal corresponding to the infrared signal received from the remote controller 300 to the control section 60.

The image input section 21 receives image information D input from the outside, and then outputs the image information D to the image processing section 22.

The image processing section 22 performs image processing on the image information D using the frame memory 23 in accordance with the control by the control section 60 to generate an image signal. For example, in the case in which the resolution of the image represented by the image information D is different from the resolution of the light modulation section 32 of the projection section 30, the image processing section 22 performs a process of converting the resolution on the image information D to generate the image signal. Here, the light modulation section 32 is provided with three liquid crystal panels corresponding respectively to the three primary colors of RGB. Therefore, the image processing section 22 generates image signals corresponding respectively to the primary colors of R, G, and B.

The light modulation section drive section 24 generates a data signal suitable for the operation of the liquid crystal panels of the light modulation section 32 from the image signals. The light modulation section drive section 24 applies a voltage to each pixel of each of the liquid crystal panels of RGB of the light modulation section 32 based on the data signal to draw an image on each of the liquid crystal panels.

The light source drive section 25 puts on and off the light source section 31 of the projection section 30 in accordance with the control by the control section 60.

The projection section 30 projects the image light corresponding to the image information D through the focusing lens 201. The projection section 30 includes the light source section 31 and the light modulation section 32.

The light source section 31 is provided with a light source formed of a xenon lamp, a super-high pressure mercury lamp, alight emitting diode (LED), a laser source, or the like. The light source section 31 can also be provided with a reflector and an auxiliary reflector for guiding the light emitted by the light source to the light modulation section 32. The light source section 31 can also be provided with a lens group for improving the optical characteristics of the projection light, a polarization plate, a dimming element for reducing the light intensity of the light emitted by the light source on a path leading to the light modulation section 32, and so on (none of them shown).

As described above, the light modulation section 32 is provided with three liquid crystal panels corresponding respectively to the three primary colors of RGB. The liquid crystal panels of the light modulation section 32 each operate based on the data signal of the corresponding color.

The light emitted by the light source section 31 is separated into colored light beams of three colors of RGB by a light separation section not shown. The colored light beams of RGB respectively enter the corresponding liquid crystal panels (the light modulation section 32). The three liquid crystal panels of the light modulation section 32 are each a transmissive liquid crystal panel, and each modulate the incident light to generate the image light beam. The image light beams having been generated by the respective liquid crystal panels are combined by a combining optical system (not shown) such as a cross dichroic prism, and turn to the projection image as the image light. The projection image is made to pass through the focusing lens 201 of the projection lens unit 200, and is then projected on the screen SC.

The motor 41 is an example of a drive section. The motor 41 rotates the focusing ring 202 to thereby move the focusing lens 201.

The position detection section 42 is an example of a detection section. The position detection section 42 detects the position of the focusing lens 201. The position detection section 42 detects the position (rotational position) of the focusing ring 202 as the position of the focusing lens 201. In the present embodiment, the position detection section 42 is provided with a variable resistance varying in resistance value in accordance with the rotational position of the focusing ring 202, and outputs an output signal corresponding to the resistance value of the variable resistance as a detection result of the position of the focusing lens 201. It should be noted that the configuration of the position detection section 42 is not limited to the configuration provided with the variable resistance, but can arbitrarily be changed.

The acquisition section 43 obtains the lens type ID from the storage section 203 of the projection lens unit 200.

The storage section 50 is a computer-readable recording medium. The storage section 50 is, for example, a flash memory. It should be noted that the storage section 50 is not limited to the flash memory, but can arbitrarily be changed. The storage section 50 stores a control program to be executed by the control section 60, and a variety of types of information (e.g., focusing lens position information, and the lens type ID).

The control section 60 is a computer such as a central processing unit (CPU). The control section 60 can also be formed of one processor, or a plurality of processors. The control section 60 retrieves and then executes the control program stored in the storage section 50 to thereby realize a projection control section 61, a focus control section 62, a determination section 63, and a lens calibration execution section 64. It should be noted that the projection control section 61, the focus control section 62, the determination section 63, and the lens calibration execution section 64 can also be realized by the one processor, or the plurality of processors constituting the control section 60. Further, it is also possible for the image processing section 22 to be realized by the one processor, or the plurality of processors.

The projection control section 61 controls the image processing section 22, the light modulation section drive section 24, and the light source drive section 25 to make the projection section 30 project the image light (the projection image) in accordance with the operation signal received from the operating section 11 or the reception section 12.

The focus control section 62 controls the motor 41 to adjust the position of the focusing lens 201 in accordance with the operation signal received from the operation section 11 or the reception section 12. Specifically, the focus control section 62 drives the motor 41 in accordance with the operation signal to rotate the focusing ring 202, and adjusts the position of the focusing lens 201 in accordance with the rotation of the focusing ring 202.

Further, the focus control section 62 obtains the detection result of the position of the focusing lens 201 from the position detection section 42 every time the focus control section 62 moves the focusing lens 201. The focus control section 62 stores the focusing lens position information representing the detection result of the position of the focusing lens 201 to the storage section 50.

In the case in which the focus control section 62 has newly obtained the detection result of the position of the focusing lens 201 in the situation in which the focusing lens position information has already been stored in the storage section 50, the focus control section 62 updates the focusing lens position information having already been stored with the focusing lens position information representing the latest position of the focusing lens 201.

The determination section 63 determines whether or not the projection lens unit 200 (the focusing lens 201) has been replaced.

If the focusing lens position information has been stored in the storage section 50 when the power supply to the projector 100 has been started, the determination section 63 obtains the detection result of the position of the focusing lens 201 from the position detection section 42. Subsequently, the determination section 63 determines whether or not the projection lens unit 200 has been replaced based on the position (the first position) of the focusing lens 201 represented by the focusing lens position information, and the detection result (the second position) of the position of the focusing lens 201 obtained from the position detection section 42. For example, in the case in which the first position and the second position are different from each other, the determination section 63 determines that the projection lens unit 200 has been replaced.

Further, when the power supply to the projector 100 is started, the determination section 63 obtains the lens type ID from the acquisition section 43. In the case in which the lens type ID has not been stored in the storage section 50 when the determination section 63 obtains the lens type ID, the determination section 63 stores the lens type ID thus obtained to the storage section 50. In contrast, in the case in which the lens type ID has already been stored in the storage section 50 when the determination section 63 obtains the lens type ID, the determination section determines whether or not the projection lens unit 200 has been replaced based on the relationship between the lens type ID stored in the storage section 50 and the lens type ID thus obtained. Here, the lens type ID stored in the storage section 50 is the lens type ID at the first time point, and the lens type ID obtained from the acquisition section 43 is the lens type ID at the second time point.

In the case in which the determination section 63 has determined that the projection lens unit 200 has been replaced, the projection control section 61 controls the image processing section 22, the light modulation section drive section 24, and the light source drive section 25 to make the projection section 30 project the image light for prompting the lens calibration. The image light for prompting the lens calibration is an example of the image light for prompting the measurement of the relationship between the actual position of the focusing lens 210 and the position detected by the position detection section 42.

The lens calibration is a process of measuring the relationship between the actual position of the focusing lens 201 and the position detected by the position detection section 42.

In the present embodiment, the range in which the focusing lens 201 can move corresponds to the range in which the focusing ring 202 can rotate. Therefore, in the lens calibration, firstly, the focusing ring 202 is rotated to one end of the range in which the focusing ring 202 can rotate due to the rotation of the motor 41, and the output (the detection result) of the position detection section 42 at that moment is recorded. Subsequently, the focusing ring 202 is rotated to the other end of the range in which the focusing ring 202 can rotate due to the rotation of the motor 41, and the output (the detection result) of the position detection section 42 at that moment is recorded.

The lens calibration execution section 64 performs the lens calibration using the motor 41, and the position detection section 42. The lens calibration execution section 64 is an example of the measurement section.

Then, the operation will be described.

Hereinafter, in order to achieve simplification of the explanation, it is assumed that the projection lens unit 200 is changed from the projection lens unit 200A to the projection lens unit 200B in the period in which the power supply to the projector 100 is stopped.

Figure 2:
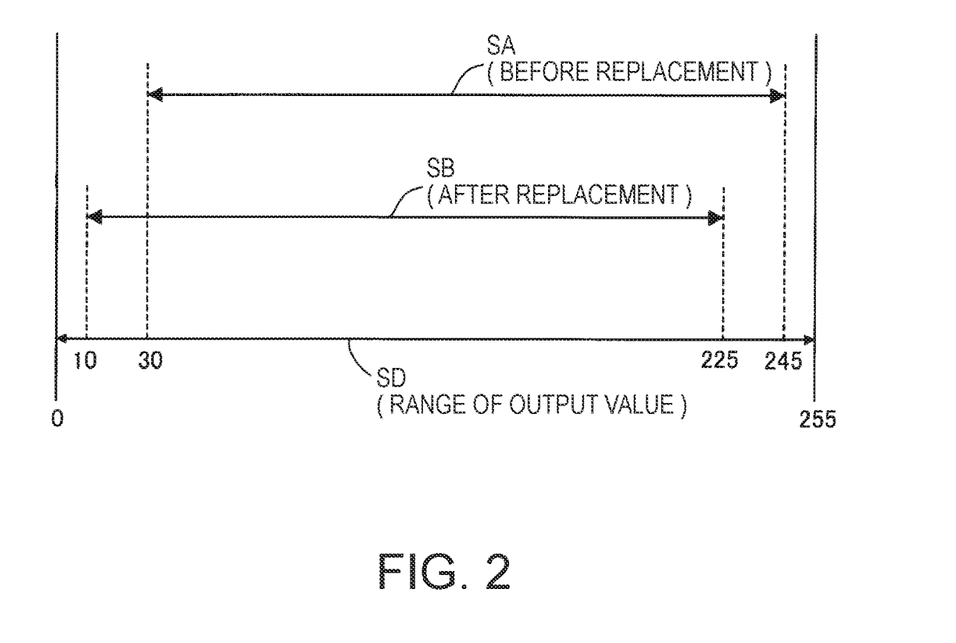
FIG. 2 is a diagram showing a range in which the focusing lens can be moved.

FIG. 2 is a diagram showing a relationship between the range SA in which the focusing lens 201 of the projection lens unit 200A before the replacement can move, the range SB in which the focusing lens 201 of the projection lens unit 200B after the replacement can move, and the range SD of the output value which can be output by the position detection section 42. The range SD is a range of 0 through 255. The position detection section 42 indicates the position of the focusing lens 201 with either one of values of 0 through 255.

In the example shown in FIG. 2, the range SA is represented by the output value of the position detection section 42 as "30 through 245." Further, the range SB is represented by the output value of the position detection section 42 as "10 through 225."

Therefore, in the case in which the projection lens unit 200A is installed, the focus control section 62 moves the focusing lens 201 in a range in which the output value of the position detection section 42 becomes in a range of "30 through 245."

In contrast, in the case in which the projection lens unit 200B is installed, it is preferable for the focus control section 62 to move the focusing lens 201 in a range in which the output value of the position detection section 42 becomes in a range of "10 through 225."

However, in the case in which the lens calibration is not performed after the replacement with the projection lens unit 200B, the focus control section 62 moves the focusing lens 201 in a range in which the output value of the position detection section 42 becomes in a range of "30 through 245," and as a result, it becomes unachievable to appropriately control the position of the focusing lens 201.

Therefore, in the present embodiment, the replacement with the projection lens unit 200B is detected, and the notice of the replacement is given to the user to prompt the execution of the lens calibration.

Figure 3:
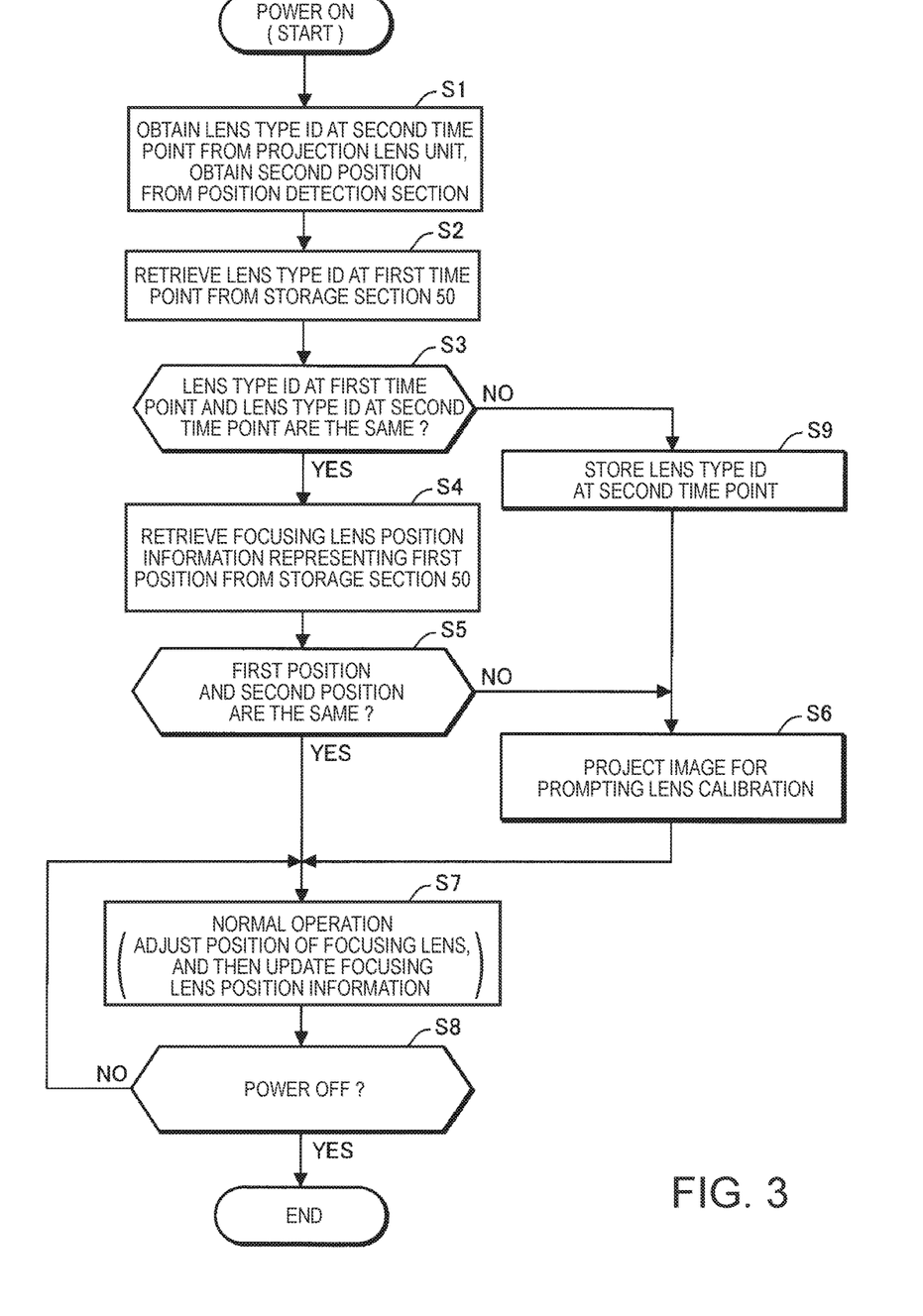
FIG. 3 is a flowchart for explaining an operation of the projector.

FIG. 3 is a flowchart for explaining the operation related to the replacement of the projection lens unit 200 out of the operations of the projector 100. It is assumed that the storage section 50 stores the focusing lens position information representing the first position (the position of the focusing lens 201 of the projection lens unit 200A at the first time point at which the power supply to the projector 100 is stopped), and the lens type ID of the projection lens unit 200A at the first time point.

When the operation section 11 or the power key of the remote controller 300 is operated, and the power supply to the projector 100 is started, the determination section 63 makes the acquisition section 43 obtain the lens type ID from the storage section 203, and then obtains the lens type ID from the acquisition section 43. Subsequently, the determination section 63 makes the position detection section 42 detect the position of the focusing ring 202 as the position of the focusing lens 201, and then obtains (step S1) the detection result from the position detection section 42.

Here, the lens type ID obtained in the step S1 is the lens type ID at the second time point, and the position of the focusing lens 201 obtained in the step S1 is the position (the second position) of the focusing lens 201 at the second time point.

Subsequently, the determination section 63 retrieves (step S2) the lens type ID from the storage section 50. This lens type ID is the lens type ID at the first time point.

Subsequently, if the lens type ID at the first time point obtained in the step S2 is the same as the lens type ID at the second time point obtained in the step S1 (YES in the step S3), the determination section 63 retrieves (step S4) the focusing lens position information from the storage section 50. Here, the focusing lens position information retrieved in the step S4 represents the position (the first position) of the focusing lens 201 at the first time point.

Subsequently, if the first position represented by the focusing lens position information retrieved in the step S4 is different from the second position obtained in the step S1 (NO in the step S5), the determination section 63 determines that the projection lens unit 200 has been replaced.

In the case in which the determination section 63 has determined that the projection lens unit 200 has been replaced based on the step S5, the projection control section controls the image processing section 22, the light modulation section drive section 24, and the light source drive section 25 to make (step S6) the projection section 30 project the image light (e.g., a message expressing the tenor of "Please run the lens calibration") for prompting the lens calibration.

For example, the projection control section 61 outputs a lighting instruction for putting on the light source section 31 to the light source drive section 25, outputs an operation instruction for operating the light modulation section drive section 24 to the light modulation section drive section 24, and outputs the lens calibration image information representing an image for prompting the lens calibration to the image processing section 22.

When the image processing section 22 receives the lens calibration image information, the image processing section 22 performs image processing on the lens calibration image information to generate the image signal, and then outputs the image signal to the light modulation section drive section 24. The light modulation section drive section 24 drives the light modulation section 32 based on this image signal. Therefore, the projection section 30 projects the image light for prompting the lens calibration on the screen SC through the focusing lens 201.

When the user sees the image for prompting the lens calibration projected on the screen SC, and recognizes that the lens calibration is necessary, the user operates, for example, the operation section 11 to input the execution instruction of the lens calibration. When the operation section 11 receives the execution instruction of the lens calibration, the operation section 11 outputs the operation signal corresponding to the execution instruction of the lens calibration to the control section 60.

The lens calibration execution section 64 of the control section 60 performs the lens calibration in response to the operation signal corresponding to the execution instruction of the lens calibration.

Subsequently, the projector 100 performs a normal operation. In the normal operation, when the operation section 11 or the remote controller 300 is operated, and the focus control section 62 drives the motor 41 to move the focusing lens 201, the focus control section 62 obtains the detection result of the position of the focusing lens 201 from the position detection section 42. Subsequently, the focus control section 62 updates (step S7) the focusing lens position information stored in the storage section 50 with the focusing lens position information representing the latest position of the focusing lens 201.

Subsequently, the step S7 is executed until the power key of the operation section 11 or the remote controller 300 is operated to stop the power supply to the projector 100 (NO in the step S8). When the power supply to the projector 100 is stopped (YES in the step S8), the projector 100 stops the operation.

Further, in the case in which the lens type ID at the first time point and the lens type ID at the second time point are different from each other in the step S3 (NO in the step S3), the determination section 63 determines that the projection lens unit 200 has been replaced.

In the case in which the determination section 63 has determined that the projection lens unit 200 has been replaced based on the step S3, the determination section 63 updates (step S9) the lens type ID at the first time point stored in the storage section 50 with the lens type ID at the second time point obtained in the step S1. Therefore, it results that the lens type ID of the projection lens unit 200B after the replacement is stored in the storage section 50. Subsequently, the step S6 is performed.

It should be noted that the step S9 is also executed in the case in which the lens type ID at the first time point is not stored in the storage section 50 in the step S2.

Further, in the case in which the first position and the second position are different from each other in the step S5, the step S6 is executed. It should be noted that the step S6 is also executed in the case in which the focusing lens position information representing the first position is not stored in the storage section 50 in the step S4.

In the projector 100 and the method of controlling the projector 100 according to the present embodiment, whether or not the focusing lens 201 has been replaced is determined using the fact that there is a low possibility that the position of the focusing lens 201 before the replacement and the position of the focusing lens 201 after the replacement coincide with each other. Specifically, whether or not the focusing lens 201 has been replaced is determined based on the position of the focusing lens 201 at the first time point at which the power supply to the projector 100 is stopped, and the position of the focusing lens 201 at the second time point at which the power supply is started after the first time point. Therefore, it becomes possible to determine whether or not the projection lens unit 200 has been replaced even if the type of the projection lens unit 200A before the replacement is the same as the type of the projection lens unit 200B after the replacement.

Further, in the present embodiment, it is possible to detect the replacement of the projection lens unit 200 of the same lens type without requiring either an additional component or an additional mechanism for the projection lens unit 200. For example, an additional component is required in Comparative Example 1 and Comparative Example 2 described below.

Comparative Example 1

In Comparative Example 1, an individual serial ID is recorded in each of the projection lens units 200, and the projector 100 checks the individual serial ID of the projection lens unit 200 to thereby detect the replacement of the projection lens unit 200.

In Comparative Example 1, a dedicated component (e.g., a dedicated integrated circuit (IC) for storing the serial ID) for storing the individual serial ID is required for the projection lens unit 200 as an additional component. Further, Comparative Example 1 has a problem that the projection lens unit 200 which does not store the serial ID and has already been distributed cannot be used.

It should be noted that if the information for identifying the projection lens unit 200 is the lens type ID as in the present embodiment, it is possible to take a simple configuration which can be realized by bit detection using a plurality of contact points.

Comparative Example 2

Comparable Example 2 is an example of making the lens calibration due to the replacement of the projection lens unit 200 unnecessary to make the detection of the replacement of the projection lens unit 200 unnecessary.

In the comparative example 2, the lens calibration is performed on each of the projection lens units 200 in the factory, and the lens calibration result is recorded on the projection lens unit 200. Therefore, in Comparative Example 2, the dedicated component (e.g., the dedicated IC for storing the result of the lens calibration result) is also required for the projection lens unit 200 as the additional component. Further, Comparative Example 2 has a problem that the projection lens unit 200 which does not store the lens calibration result and has already been distributed cannot be used.

Further, in Comparative Example 2, since the lens calibration is performed and then the writing of the lens calibration result is further performed in the factory, there arises a problem that the lead time in the factory increases.

Modified Examples

The invention is not limited to the embodiment described above, but can variously be modified as described below, for example. Further, it is also possible to arbitrarily combine one or more modifications arbitrarily selected from the configurations of the modifications described below.

Modified Example 1

It is also possible to determine whether or not the projection lens unit 200 has been replaced using the positions of a plurality of lenses included in the projection lens unit 200.

Figure 4:
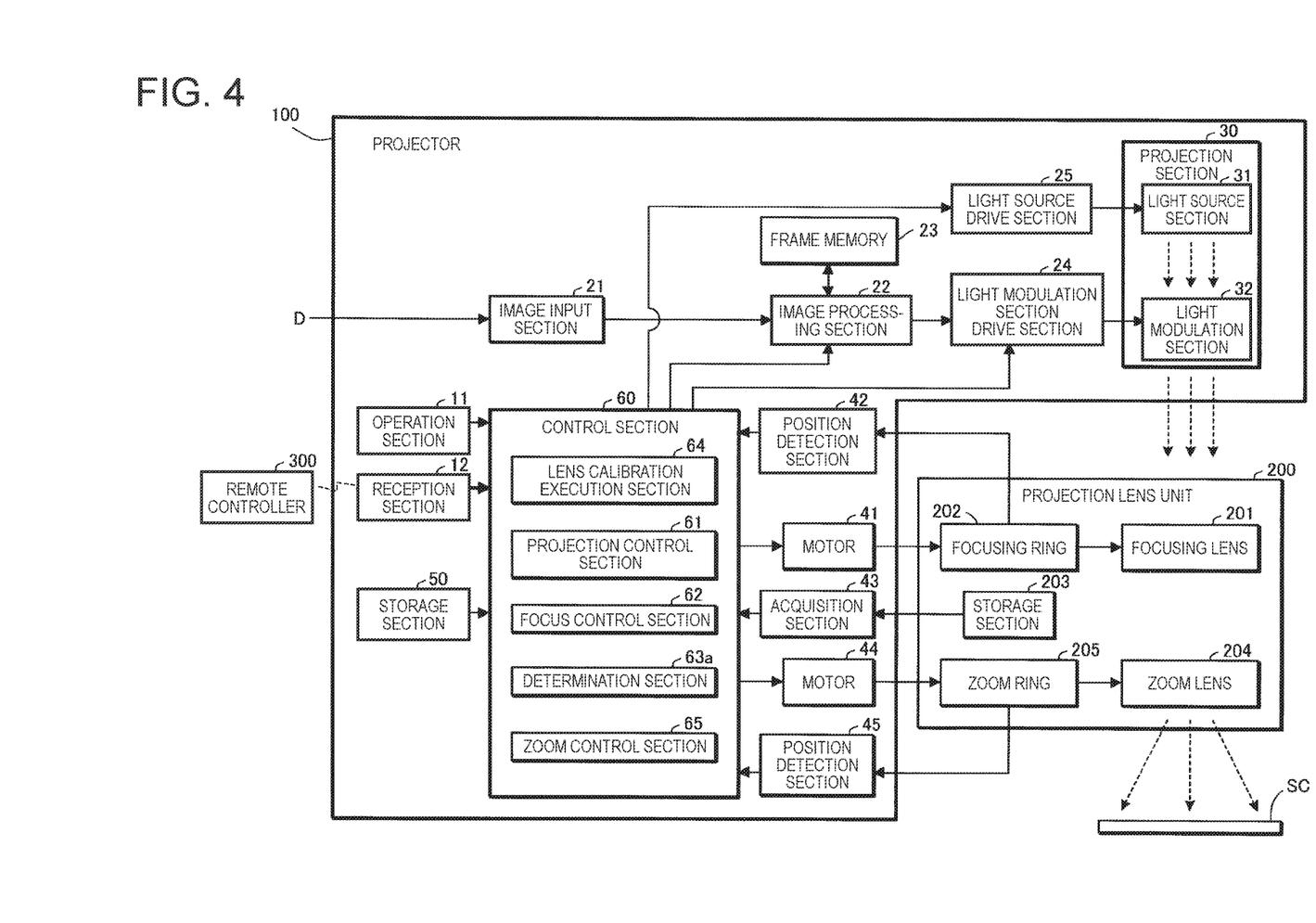
FIG. 4 is a diagram showing a projector according to Modified Example 1.

FIG. 4 is a diagram showing the projector 100 according to Modified Example 1.

In Modified Example 1, the projection lens unit 200 includes a zoom lens 204 and a zoom ring 205 in addition to the focusing lens 201, the focusing ring 202, and the storage section 203.

The focusing lens 201 is an example of the first lens. The zoom lens 204 is an example of the second lens. The focusing lens 201 and the zoom lens 204 are included in the projection lens.

The zoom ring 205 can rotate around the optical axis of the zoom lens 204 used as a rotational axis. The zoom lens 204 moves along the optical axis of the zoom lens 204 in accordance with the rotation of the zoom ring 205. Therefore, the position of the zoom lens 204 corresponds to the position (rotational position) of the zoom ring 205.

Further, in Modified Example 1, the projector 100 further includes a motor 44 and a position detection section 45. The control section 60 retrieves and then executes the control program stored in the storage section 50 to thereby further realize the zoom control section 65. Further, the control section 60 retrieves and then executes the control program to thereby realize a determination section 63a instead of the determination section 63.

The motor 44 is included in the drive section together with the motor 41. The motor 44 rotates the zoom ring 205 to thereby move the zoom lens 204.

The position detection section 45 detects the position of the zoom lens 204. The position detection section 45 detects the position (rotational position) of the zoom ring 205 as the position of the zoom lens 204. The position detection section 45 is provided with a variable resistance varying in resistance value in accordance with the rotational position of the zoom ring 205, and outputs an output signal corresponding to the resistance value of the variable resistance as a detection result of the position of the zoom lens 204. It should be noted that the configuration of the position detection section 45 is not limited to the configuration provided with the variable resistance, but can arbitrarily be changed.

The zoom control section 65 controls the motor 44 to adjust the position of the zoom lens 204 in accordance with the operation signal received from the operation section 11 or the reception section 12. Specifically, the zoom control section 65 drives the motor 44 in accordance with the operation signal to rotate the zoom ring 205, and adjusts the position of the zoom lens 204 in accordance with the rotation of the zoom ring 205.

Further, the zoom control section 65 obtains the detection result of the position of the zoom lens 204 from the position detection section 45 every time the zoom control section 65 moves the zoom lens 204. The zoom control section 65 stores the zoom lens position information representing the detection result of the position of the zoom lens 204 to the storage section 50.

In the case in which the zoom control section 65 has newly obtained the detection result of the position of the zoom lens 204 in the situation in which the zoom lens position information has already been stored in the storage section 50, the zoom control section 65 updates the zoom lens position information having already stored with the zoom lens position information representing the latest position of the zoom lens 204.

The determination section 63a has the following function in addition to the function provided to the determination section 63.

The determination section 63a determines whether or not the projection lens unit 200 (the focusing lens 201 and the zoom lens 204) has been replaced based on the relationship between the position of the focusing lens 201 at the first time point and the position of the focusing lens 201 at the second time point, and a relationship between the position of the zoom lens 204 at the first time point and the position of the zoom lens 204 at the second time point.

If zoom lens position information has been stored in the storage section 50 when the power supply to the projector 100 has been started, the determination section 63a obtains the detection result of the position of the zoom lens 204 from the position detection section 45. In the case in which the zoom lens position information is stored in the storage section 50 when the power supply to the projector 100 has been started, the position of the zoom lens 204 represented by the zoom lens position information is the position of the zoom lens 204 at the first time point, and the position of the zoom lens 204 obtained from the position detection section 45 is the position of the zoom lens 204 at the second time point.

Subsequently, in the case in which the lens type ID at the first time point is different from the lens type ID at the second time point, or the first position is different from the second position, or the position of the zoom lens 204 at the first time point is different from the position of the zoom lens 204 at the second time point, the determination section 63a determines that the projection lens unit 200 (the focusing lens 201 and the zoom lens 204) has been replaced.

According to Modified Example 1, it becomes possible, for example, to determine that the projection lens unit 200 has been replaced if the position of the zoom lens 204 is different between the first time point and the second time point even if the position of the focusing lens 201 is accidentally the same between the first time point and the second time point despite the fact that the projection lens unit 200 has been replaced. Therefore, the possibility that it is determined that the projection lens unit 200 has not been replaced despite the fact that the projection lens unit 200 has been replaced can be reduced compared to the first embodiment.

Modified Example 2

In the first embodiment, it is also possible for the determination section 63 to determine that the projection lens unit 200 has been replaced in the case in which a distance between the first position and the second position is longer than a threshold value instead of determining that the projection lens unit 200 has been replaced in the case in which the first position and the second position are different from each other. In this case, the threshold value is stored in the storage section 50, and the determination section 63 retrieves the threshold value from the storage section 50.

There is a possibility that an error is included in at least one of the first position and the second position detected by the position detection section 42. In the first embodiment described above, if the error is included in at least one of the first position and the second position, the first position and the second position are different from each other despite the fact that the projection lens unit 200 has not been replaced, and it is erroneously determined that the projection lens unit 200 has been replaced.

In Modified Example 2, it is determined that the projection lens has been replaced in the case in which the distance between the first position and the second position is longer than the threshold value. Therefore, even if an error is included in at least one of the first position and the second position, the possibility that it is erroneously determined that the projection lens unit 200, which has not been replaced, has been replaced due to the error can be reduced compared to the first embodiment.

Modified Example 3

In Modified Example 1, it is also possible for the determination section 63a to determine that the projection lens unit 200 has been replaced in the case in which the lens type ID at the first time point is different from the lens type ID at the second time point, or the distance between the first position and the second position is longer than a first threshold value, or the distance between the position of the zoom lens 204 at the first time point and the position of the zoom lens 204 at the second time point is longer than a second threshold value. In this case, the first threshold value and the second threshold value are stored in the storage section 50, and the determination section 63a retrieves the first threshold value and the second threshold value from the storage section 50.

Figure 5:
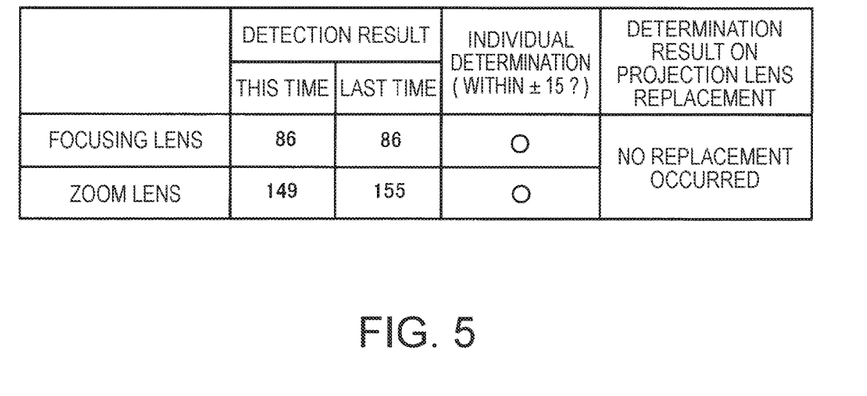
FIG. 5 is a diagram for explaining Determination Example 1 in Modified Example 3.

FIG. 5 is a diagram for explaining Determination Example 1 in Modified Example 3.

In Determination Example 1, it is assumed that "15" is used as the first threshold value and the second threshold value, and the lens type ID at the first time point is the same as the lens type ID at the second time point.

In Determination Example 1, the first position is "86," the second position is "86," and the distance between the first position and the second position is "0." Therefore, the length between the first position and the second position is equal to or shorter than the first threshold value.

Further, in Determination Example 1, the position of the zoom lens 204 at the first time point is "155," the position of the zoom lens 204 at the second time point is "149," and the distance between the position of the zoom lens 204 at the first time point and the position of the zoom lens 204 at the second time point is "6." Therefore, the distance between the position of the zoom lens 204 at the first time point and the position of the zoom lens 204 at the second time point is equal to or lower than the second threshold value.

Therefore, in Determination Example 1, the determination section 63a determines that the projection lens unit 200 has not been replaced.

Figure 6:
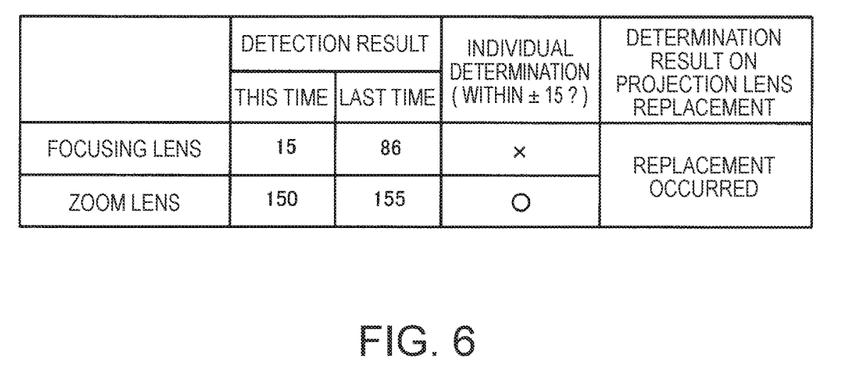
FIG. 6 is a diagram for explaining Determination Example 2 in Modified Example 3.

FIG. 6 is a diagram for explaining Determination Example 2 in Modified Example 3.

In Determination Example 2, it is also assumed that "15" is used as the first threshold value and the second threshold value, and the lens type ID at the first time point is the same as the lens type ID at the second time point.

In Determination Example 2, the first position is "86," the second position is "15," and the distance between the first position and the second position is "71." Therefore, the length between the first position and the second position is longer than the first threshold value.

Further, in Determination Example 2, the position of the zoom lens 204 at the first time point is "155," the position of the zoom lens 204 at the second time point is "150," and the distance between the position of the zoom lens 204 at the first time point and the position of the zoom lens 204 at the second time point is "5." Therefore, the distance between the position of the zoom lens 204 at the first time point and the position of the zoom lens 204 at the second time point is equal to or lower than the second threshold value.

Therefore, in Determination Example 2, the determination section 63a determines that the projection lens unit 200 has been replaced.

In Modified Example 3, even if an error is included in the detection result of the position detection section 42 and the detection result of the position detection section 45, it is possible to reduce the possibility that it is erroneously determined that the projection lens unit 200, which has not been replaced, has been replaced due to the error.

It should be noted that the first threshold value and the second threshold value are not limited to "15," but each can arbitrarily be changed.

Modified Example 4

In the case in which the projection lens unit 200 is provided with a distortion ring for moving the position of the projection lens, for example, it is possible for the position detection section 42 to detect the position (the rotational position) of the distortion ring as the position of the projection lens instead of the position (the rotational position) of the focusing ring 202.

Modified Example 5

It is also possible for the position detection section 42 to directly detect the position of the focusing lens 201 instead of the position of the focusing ring 202. Further, it is also possible for the position detection section 45 to directly detect the position of the zoom lens 204 instead of the position of the zoom ring 205.

Modified Example 6

It is also possible for the determination section 63 to determine whether or not the projection lens unit 200 has been replaced based on the relationship between the first position and the second position irrespective of the relationship between the lens type ID at the first time point and the lens type ID at the second time point. In this case, since there is no need to obtain the lens type ID, the acquisition section 43 can be omitted.

Further, it is also possible for the determination section 63a to determine whether or not the projection lens unit 200 has been replaced based on the relationship between the first position and the second position, and the relationship between the position of the zoom lens 204 at the first time point and the position of the zoom lens 204 at the second time point irrespective of the relationship between the lens type ID at the first time point and the lens type ID at the second time point. In this case, since there is also no need to obtain the lens type ID, the acquisition section 43 can be omitted.

Modified Example 7

It is also possible for the lens calibration execution section 64 to automatically perform the lens calibration in the case in which it is determined that the projection lens unit 200 has been replaced.

Modified Example 8

It becomes approximately possible to achieve the individual identification of the projection lens units 200 by a combination of the lens type ID and the second position. Therefore, if the lens calibration execution section 64 stores the execution result of the lens calibration to the storage section 50 so as to be associated with the combination of the lens type ID and the second position, it becomes possible to store the execution result of the lens calibration for each of the projection lens units 200. In this case, it becomes possible for the lens calibration execution section 64 to reuse the execution result of the lens calibration stored in the storage section 50 without re-executing the lens calibration with respect to the projection lens unit 200 to which the lens calibration has once been executed.

Modified Example 9

The usage configuration of the projector 100 can be either one of the configuration of the front projection type for projecting the projection image from the front to the screen SC, and the configuration of the rear projection type for projecting the projection image to the back surface of the screen SC of a transmissive type.

Modified Example 10

Although the liquid crystal light valves are used as the light modulation device 32, the light modulation device 32 is not limited to the liquid crystal light valves, but can arbitrarily be changed. For example, it is also possible for the light modulation section 32 to have a configuration using three reflective liquid crystal panels. Further, it is also possible for the light modulation device 32 to have a configuration such as a system using a single liquid crystal panel, a system using three digital mirror devices (DMD), or a system using a single digital mirror device. In the case of using just one liquid crystal panel or DMD as the light modulation device 32, the members corresponding to the color separation optical system and the color combining optical system are unnecessary. Further, besides the liquid crystal panel or the DMD, any configurations capable of modulating the light emitted by the light source can be adopted as the light modulation device.

Modified Example 11

Some or all of the elements realized by the control section 60 retrieving and executing the control program can also be realized by hardware using an electronic circuit such as a FPGA (field programmable gate array) or an ASIC (application specific IC), or can also be realized by a cooperative operation of software and hardware.

What is claimed is:

1. A projector comprising:
a projection lens having a focus lens and a zoom lens;
a drive section adapted to move the projection lens;
a projection section adapted to project image light through the projection lens;
a determination section adapted to determine whether or not the projection lens has been replaced based on:
  a first relationship between a position of the focus lens at a first time point at which power supply to the projector is stopped, and a position of the focus lens at a second time point at which the power supply is started after the first time point, and
  a second relationship between a position of the zoom lens at the first time point and a position of the zoom lens at the second time point;
a detection section adapted to detect a position of the projection lens; and
a projection control section adapted to make the projection section project a message for prompting a user to make the projector measure a relationship between an actual position of the projection lens and a position of the projection lens detected by the detection section in a case in which the determination section has determined that the projection lens has been replaced.

2. The projector according to claim 1, wherein
the determination section determines that the projection lens has been replaced in a case in which the first relationship or the second relationship indicate a change in position of one of the focus lens or the zoom lens.

3. The projector according to claim 1, wherein
the determination section determines that the projection lens has been replaced in a case in which one of the first relationship or second relationship is longer than a threshold value.

4. The projector according to claim 1, wherein
the projection lens is provided with identification information corresponding to a type of the projection lens, and
the determination section determines whether or not the projection lens has been replaced based also on a relationship between the identification information of the projection lens at the first time point and the identification information of the projection lens at the second time point.

5. The projector according to claim 1, further comprising:
a detection section adapted to detect a position of the projection lens; and
a measurement section adapted to measure a relationship between an actual position of the projection lens and a position of the projection lens detected by the detection section in a case in which the determination section has determined that the projection lens has been replaced.

6. A method of controlling a projector, comprising:
generating image light;
projecting the image light through a projection lens which can be moved, the projection lens having a focus lens and a zoom lens;
determining whether or not the projection lens has been replaced based on:
  a first relationship between a position of the focus lens at a first time point at which power supply to the projector is stopped, and a position of the focus lens at a second time point at which the power supply is started after the first time point, and
  a second relationship between a position of the zoom lens at the first time point and a position of the zoom lens at the second time point;
detecting a position of the projection lens; and
projecting a message for prompting a user to make the projector measure a relationship between an actual position of the projection lens and the detected position of the projection lens in a case in which it is determined that the projection lens has been replaced.

7. A projector comprising:
a drive section adapted to move a projection lens which includes a focus lens and a zoom lens;
a projection section adapted to project image light through the projection lens;
a storage section which stores a first threshold value;
a determination section adapted to determine whether or not the projection lens has been replaced based on a first distance between a first position and a second position being longer than the first threshold value, the first position being a position of the focus lens at a first time point at which power supply to the projector is stopped, the second position being a position of the focus lens at a second time point at which the power supply is started after the first time point;

a detection section adapted to detect a position of the projection lens; and a projection control section adapted to make the projection section project a message for prompting a user to make the projector measure a relationship between an actual position of the projection lens and a position of the projection lens detected by the detection section in a case in which the determination section has determined that the projection lens has been replaced.

8. The projector according to claim 7, wherein the storage section stores a second threshold value, and the determination section is adapted to determine whether or not the projection lens has been replaced based on the first distance and a second distance between a third position and a fourth position being longer than the second threshold value, the third position being a position of the zoom lens at the first time point, and the fourth position being a position of the zoom lens at the second time point.

* * * * *